(12) United States Patent
Welch et al.

(10) Patent No.: US 7,632,325 B2
(45) Date of Patent: Dec. 15, 2009

(54) FILTER ASSEMBLY

(75) Inventors: Jason Cristoffer Welch, Belton, MO (US); Danny Lee Deatherage, Raytown, MO (US)

(73) Assignee: General Electric Company, Schenectady, NY (US)

( * ) Notice: Subject to any disclaimer, the term of this patent is extended or adjusted under 35 U.S.C. 154(b) by 504 days.

(21) Appl. No.: 11/605,539

(22) Filed: Nov. 28, 2006

(65) Prior Publication Data

US 2008/0120949 A1    May 29, 2008

(51) Int. Cl.
  *B01D 46/02* (2006.01)
(52) U.S. Cl. ........................................ 55/341.1; 55/378
(58) Field of Classification Search ................. 55/341.1, 55/378, 341.4, 341.6, 372, 360, 374, 381, 55/382, 498; 210/243; 95/70, 59, 63; 96/55
See application file for complete search history.

(56) References Cited

U.S. PATENT DOCUMENTS

| | | | |
|---|---|---|---|
| 3,177,636 A * | 4/1965 | Jensen | 55/341.1 |
| 4,559,138 A | 12/1985 | Harms, II | |
| 5,057,131 A * | 10/1991 | Lackner et al. | 55/369 |
| 6,375,698 B1 | 4/2002 | Clements et al. | |
| 7,341,616 B2 * | 3/2008 | Taylor et al. | 95/70 |
| 7,438,736 B1 * | 10/2008 | Grey | 55/341.2 |

* cited by examiner

*Primary Examiner*—Duane Smith
*Assistant Examiner*—Minh-Chau T Pham
(74) *Attorney, Agent, or Firm*—Greg Strugalski; Ernest G. Cusick; Frank A. Landgraff (57) ABSTRACT

A filter assembly for use in a baghouse. The baghouse has a tube sheet with a plurality of openings. The filter assembly includes a first filter element including a mounting structure at a first axial end to attach the first filter element to the tube sheet adjacent an opening. A first tubular member is fixed to and extends from the mounting structure. A first pleated filter element is disposed adjacent to the first tubular member. A first member has a threaded portion connected with the tubular member at a second axial end of the first filter element. A second filter element includes a second member having a threaded portion at a first axial end. A second tubular member is connected with and extends from the second member. A second pleated filter element is disposed adjacent to the second tubular member. The first and second threaded members are tubular. The threaded portions are threadedly engageable to connect the first filter element with the second filter element and permit fluid communication between the first and second filter elements. The threaded portions of the first and second members are located outside the axial extents of the first and second filter elements. At least one of the threaded portions has an outer diameter greater than the smallest inner diameter of the pleated filter elements.

20 Claims, 5 Drawing Sheets

FILTER ASSEMBLY

BACKGROUND OF THE INVENTION

The present invention relates generally to a filter assembly for use in a baghouse. In particular, the present invention relates to connecting structure for a multi-piece filter assembly having pleated filter elements.

There is increasing environmental regulatory control throughout the world. Much of the regulatory control is focused on reducing air-borne pollutants and emissions from certain industrial sources, such as power plants and materials production facilities. A known technique to control the pollutants and emissions from the industrial sources is to separate undesirable particulate matter that is carried in a gas stream by fabric filtration. Such fabric filtration is accomplished in a dust collection apparatus known in the industry as a "baghouse."

The baghouse typically includes a housing divided into two plenums by a tube sheet. One plenum is a "dirty air" plenum which communicates with an inlet and receives "dirty" or particulate laden gas from a source at the plant. The other plenum is a "clean air" plenum which receives cleaned gas after filtration and communicates with an outlet to direct cleaned gas away from the baghouse. A plurality of relatively long cylindrical fabric filters, commonly called "bags," are suspended from the tube sheet in the dirty air plenum. Each bag has a closed lower end and is installed over a cage. Each bag is mounted to the tube sheet at its upper end and hangs vertically downward into the dirty air plenum. The upper end portion of the bag is open and the interior of each bag is in fluid communication with the clean air plenum.

In operation, particulate laden gas is conducted into the dirty air plenum. As the particulate laden gas flows through the baghouse, the particulates carried by the gas engage the exterior of the fabric filter bags and accumulate on or in media of the fabric filter bags or are separated from the gas stream and fall into an accumulator chamber at the lower portion of the dirty air plenum. Cleaned gas then flows through the media of the fabric filter bags, into the interior of the fabric filter bags, to the clean air plenum and through the outlet. Although many baghouses are made according to this basic structure, there may be numerous operational and structural differences among baghouses.

There is interest in replacing known fabric filter bags with pleated media filter cratridges to increase the effective filtering area while occupying the same, or less, space within the baghouse. However, certain barriers to easy replacement of fabric filter bags by pleated media filter cartridges exist. In some baghouse designs, the fabric filter bags can have a length of about four meters. The clean air plenum often has a clearance height that is substantially less than four meters, for example, about two meters. It is generally not a problem to install fabric filter bags in the baghouse since the fabric filter bags are foldable, flexible and non-rigid. A relatively long and rigid pleated media filter cartridge cannot be installed without considerable manipulation if it can be installed at all due to the limited access space in the clean air plenum.

In order to occupy the same space within the baghouse as a fabric filter bag, the length of the pleated media filter cartridge would be relatively long and can be up to about four meters in length or more. This presents a problem for filter manufacturers because there are effective limits as to the width of the filter media that can be pleated with current production machinery. The current production machinery used to pleat filter media typically cannot accommodate continuous filter media more than about two meters in width. Such a long filter cartridge would also be relatively difficult to handle, transport and install. Accordingly, there is a need in the industry for improvements in filter structure.

BRIEF DESCRIPTION OF THE INVENTION

One aspect of the invention is an improved multiple piece filter assembly for use in a baghouse. The baghouse has a tube sheet with a plurality of openings. The filter assembly comprises a first filter element including a mounting structure at a first axial end to attach the first filter element to the tube sheet adjacent an opening. A first tubular member is fixed to and extends from the mounting structure. A first pleated filter media is disposed adjacent to the first tubular member. A first member has a threaded portion connected with the tubular member at a second axial end of the first filter element. A second filter element includes a second member having a threaded portion at a first axial end. A second tubular member is connected with and extends from the second member. A second pleated filter media is disposed adjacent to the second tubular member. The first and second threaded members are tubular. The threaded portions are threadedly engageable to connect the first filter element with the second filter element and permit fluid communication between the first and second filter elements. The threaded portions of the first and second members are located outside the axial extents of the first and second filter elements.

Another improved aspect of the invention is a filter assembly for use in a baghouse. The baghouse has a tube sheet with a plurality of openings. The filter assembly comprises a first filter element including a mounting structure at a first axial end to attach the first filter element to the tube sheet adjacent an opening. A first tubular member is fixed to and extends from the mounting structure. A first pleated filter element is disposed adjacent to the first tubular member. A first member has a threaded portion connected with the tubular member at a second axial end of the first filter element. A second filter element includes a second member having a threaded portion at a first axial end. A second tubular member is connected with and extends from the second member. A second pleated filter element is disposed adjacent to the second tubular member. The first and second threaded members are tubular. The threaded portions are threadedly engageable to connect the first filter element with the second filter element and permit fluid communication between the first and second filter elements. At least one of the threaded portions of the first and second members has an outer diameter greater than the smallest inner diameter of the first and second pleated filter elements.

BRIEF DESCRIPTION OF THE DRAWINGS

Further features of the invention will become apparent to those skilled in the art to which the invention relates from reading the following description with reference to the accompanying drawings, in which.

DETAILED DESCRIPTION OF THE INVENTION

Figure 1:
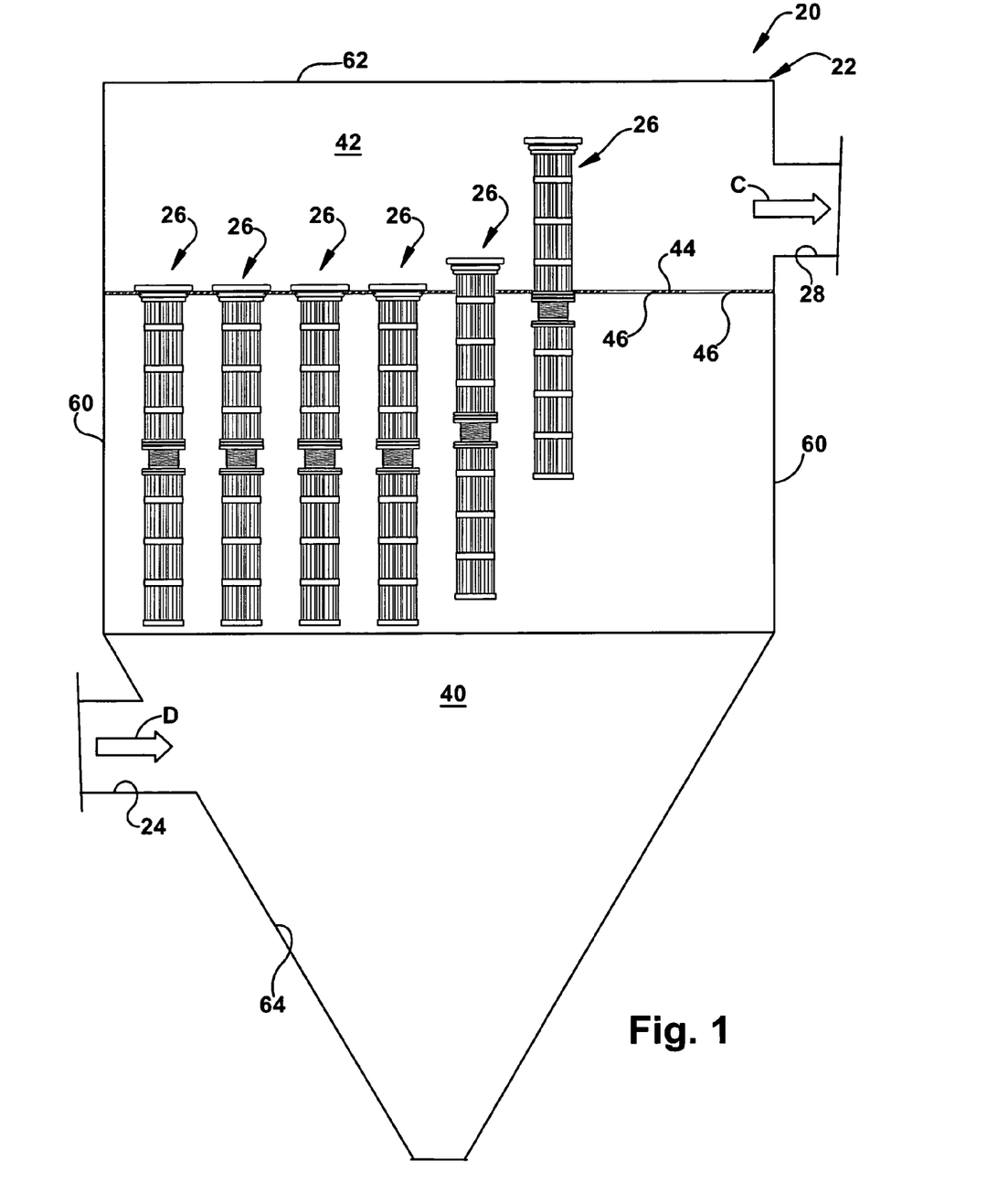
FIG. 1 is a schematic view, partly in section, of a baghouse with filter assemblies constructed according to one aspect of the invention.

A baghouse 20 is illustrated in FIG. 1. The baghouse 20 is defined by an enclosed housing 22. The housing 22 is made from a suitable material, such as sheet metal. Particulate laden gas D flows into the baghouse 20 from an inlet 24. The particulate laden gas D is filtered by a plurality of relatively long cartridges or filter assemblies 26 (best seen in FIG. 4) constructed according to one aspect of the invention located within the baghouse 20. Cleaned gas C exits through an outlet 28 of the baghouse 20.

The baghouse 20 is divided into a "dirty air" plenum 40 and a "clean air" plenum 42 by a tube sheet 44 made from a suitable material, such as sheet metal. The tube sheet 44 has at least a portion that is substantially planar. The inlet 24 is in fluid communication with the dirty air plenum 40. The outlet 28 is in fluid communication with the clean air plenum 42.

A plurality of openings 46 extend through the planar portion of the tube sheet 44. A filter assembly 26 is installed in a respective opening 46. The clean air plenum 42 has a minimum dimension or clearance height taken in a direction normal to the tube sheet 44 that defines an access space. The dirty air plenum 40 has a height taken in a direction normal to the tube sheet 44 in which a filter assembly 26 can be installed without engaging the housing 22 of the baghouse 20. The height of the dirty air plenum 40 is typically greater than the height of the clean air plenum 42.

The housing 22 of the baghouse 20 includes sides 60 and a roof 62. The baghouse 20 is illustrated as having a non-movable roof 62. Thus, access to the clean air plenum 42 and baghouse 20 is limited for installation of the filter assemblies 26. It will be apparent to one skilled in the art that the roof 62 can have access panels that are removable or movable to a position that does not inhibit access to the clean air plenum 42.

The baghouse 20 also has an accumulation chamber defined by sloped walls 64 located at a lower end of the dirty air plenum 40. The filter assemblies 26 are illustrated as not extending into the accumulation chamber 64 but it will be apparent that the filter assemblies may extend into the accumulation chamber.

Figure 5:
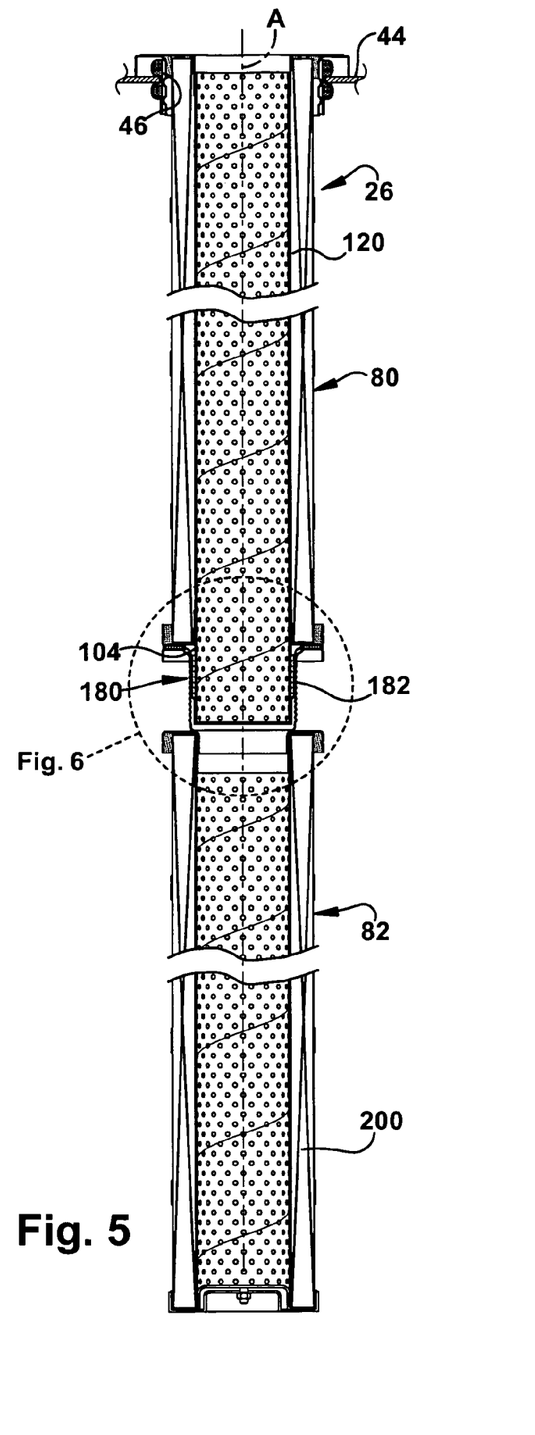
FIG. 5 is an sectional view of the filter assembly illustrated in FIG. 4.

A circumferential resilient mounting band 66 (FIGS. 2, 3 and 5) is located in one of the openings 46 in the tube sheet 44. The band 66 is made from metal, such as a stainless steel, and is covered with fabric. The band 66 is constructed with an outer diameter substantially equal to the inner diameter of the opening 46. The band 66 may be easily deformed from its normally circumferential shape and inserted into the opening 46. The exterior surface of the band 66 snugly engages the surface defining the opening 46. The band 66 provides a seal between the filter assembly 26 and the opening 46 in the tube sheet 44. The band 66 is described in detail in U.S. Pat. No. 5,746,792, which is assigned to the assignee of the present invention and incorporated herein by reference.

The filter assemblies 26 filter particulates from the particulate laden gas D as the gas passes through each filter assembly. Each filter assembly 26 is made up of at least a first or upper filter element 80 (as viewed in FIGS. 2-6) and a second lower filter element 82. The filter elements 80, 82 are axially aligned in an end-to-end stack and connected together in a fluid-tight relationship.

Each filter assembly 26 is supported at its upper end (as viewed in FIGS. 1, 4-5) by the tube sheet 44 and hangs downwardly in a substantially vertical direction. A tubular mounting sleeve 100 is located at the upper end (as viewed in FIGS. 2 and 3) of the filter assembly 26 and bears the entire weight of the filter assembly when the mounting sleeve is attached to the tube sheet 44. The mounting sleeve 100 has an outer diameter that is greater than the outer diameter of the band 66.

Each filter assembly 26 has a longitudinal central axis A. Each filter assembly 26 has an overall length taken in a direction parallel to the axis A. The length of the filter assembly 24 is greater than the clearance height of the clean air plenum 40 and preferably less than the access height of the dirty air plenum 42 at least in the location closest to the inner periphery of the housing 22. It will be apparent that any number and lengths of filter elements could be utilized that are suitable to the filtering requirements of the baghouse 20.

The length of the filter assembly 26 can be any desired length that is appropriate for particular filtering requirements. At least one of the upper and lower filter elements 80, 82 of the filter assembly 26 has a length in the range of one meter to three meters. Preferably, the length of the filter element 80 or 82 is less than the clearance height in the access space of the clean air plenum 42. It will also be apparent that the length of the upper filter element 80 can be different from the length of the lower filter element 82.

Figure 2:
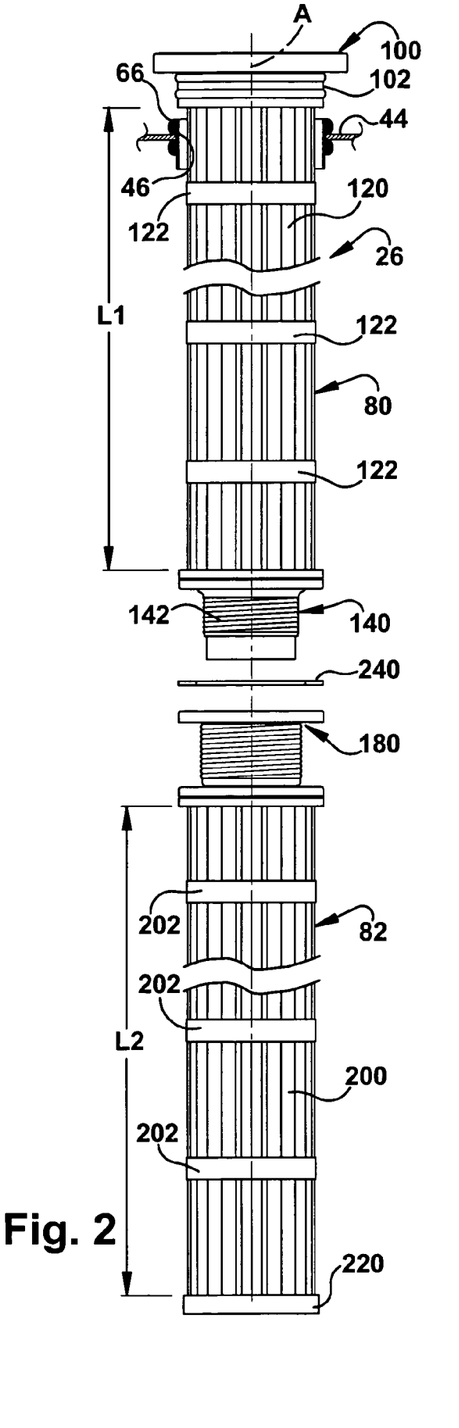
FIG. 2 is an exploded elevational view of a filter assembly illustrated in FIG. 1.
Figure 3:
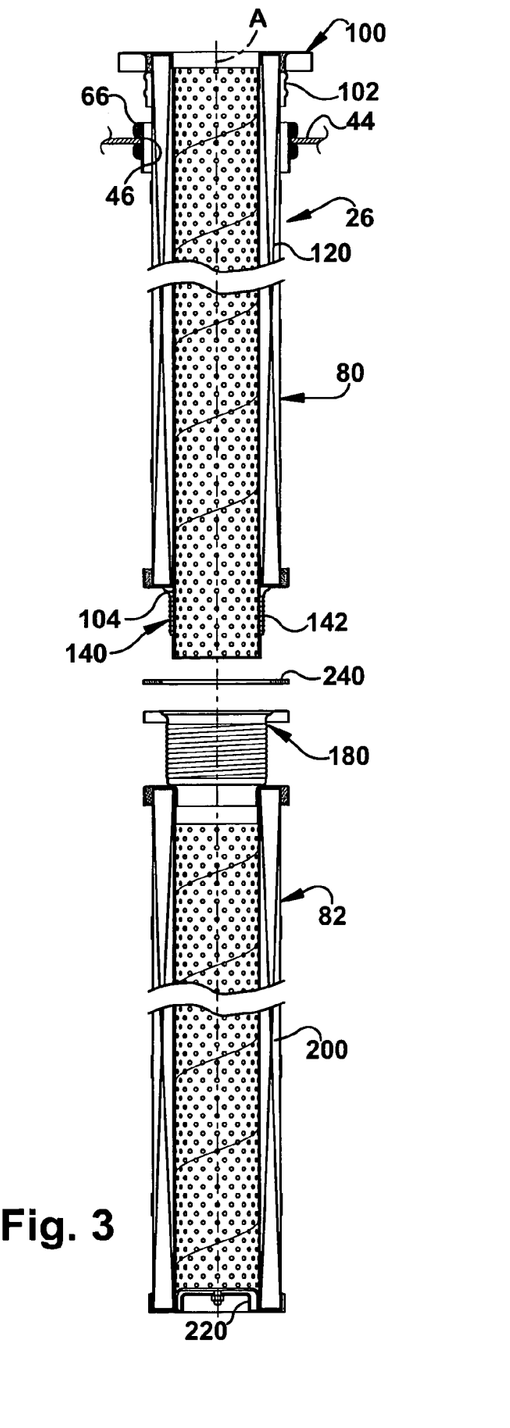
FIG. 3 is a sectional view of the filter assembly illustrated in 2.

The upper filter element 80 is open at both axial ends, as illustrated in FIG. 3. The mounting sleeve 100 is located at an upper axial end (as viewed in FIGS. 2 and 3) of the upper filter element 80 to attach the upper filter element and filter assembly 26 to the tube sheet 44. The mounting sleeve 100 is made from a suitable material, such as stamped, drawn or otherwise formed metal. The mounting sleeve 100 defines an open end of the upper filter element 80 for fluid communication with the clean air plenum 42. The upper filter element 80 has a circular cross-section.

The filter assembly 26 (FIGS. 1-5) extends through a respective opening 46 in the tube sheet 44 and through the band 66. The band 66 ensures that the filter assembly 26 may be used with openings 46 that have not been precisely cut. The mounting sleeve 100 defines an inverted cup portion that receives a part of the band 66. The mounting sleeve 100 is also described in detail in U.S. Pat. No. 5,746,792, which is assigned to the assignee of the present invention and incorporated herein by reference.

The mounting sleeve 100 has a tubular portion 102 (FIG. 3) that is adapted to be located within and extend through a respective opening 46 in the tube sheet 44 and the band 66. A tubular support member 104 (FIGS. 3 and 5-7) is fixed to and extends from the tubular portion 102 of the mounting sleeve 100. The support member 104 is made from a suitable material, such as perforated sheet metal, expanded metal or mesh screen. The upper end of the support member 104 and the mounting sleeve 100 sleeve are connected together in a suitable manner, such as by welds, rivets, fasteners or metal deformation. Thus, a relatively strong structure exists that is capable of supporting the weight of the filter assembly 26 as it hangs from the tube sheet 44 even when the filter assembly has a relatively heavy accumulation of particulates.

Figure 4:
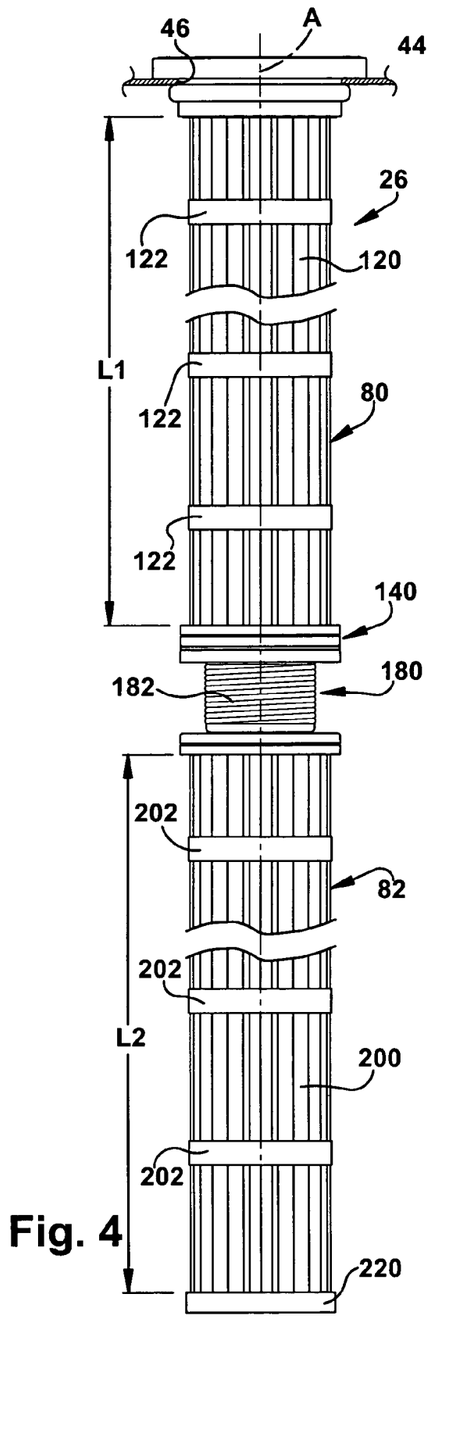
FIG. 4 is an elevational view of the filter assembly fully assembled and mounted to a tube sheet of the baghouse.

Pleated filter media 120 is located concentrically around the support member 104. The pleated filter media 120 is formed in a substantially tubular shape about the perimeter of the support member 104 with accordion folds at its inner and outer peripheries. The pleated filter media 120 has an effective filtering length or axial extent L1 (FIGS. 2 and 4). The pleated filter media 120 may be constructed of any suitable material for a desired filtering requirement. The support member 104 supports the pleated filter media 120 in a radial direction. The upper end of the pleated filter media 120 is also located in the mounting sleeve 100 and secured in a potting material, which acts to seal the pleated element and the mounting sleeve.

The filter element 80 is illustrated as having media retention devices 122 extending circumferentially about the pleated filter media 120. The retention devices 122 serve to hold the pleated filter media 120 in place during reverse pulse-jet cleaning. The retention devices 122 may be constructed as described in detail in U.S. Pat. No. 6,233,790 or 6,508,934, which are assigned to the assignee of the present invention and incorporated herein by reference.

A tubular member or collar 140 is fixed to the support member 104 at the lowermost end (as viewed in FIGS. 2-7) of the upper filter element 80. The collar 140 of the upper filter element 80 defines an open end of the upper filter element for fluid to flow through. The collar 140 is made from a suitable material, such as metal. The support member 104 and collar 140 are connected together in a suitable manner, such as by welds, rivets, fasteners or metal deformation. Thus, a relatively strong structure is provided which is capable of supporting the weight of one or more filter elements 82 that may be connected to the upper filter element 80 even when those filter elements have a heavy accumulation of particulates.

A flange portion 144 is located near the upper end of the collar 140 (as viewed in FIG. 6) and extends radially outward from the collar. A side wall 146 extends upwardly from the outer periphery of the flange 144 to form part of a receiving cup for the lower end of the pleated filter element 120. A cup part 160 is located in the collar 140. The collar 140 and cup part 160 cooperate to form the complete receiving cup for the lower end of the pleated media 120. The cup part 160 is attached to the collar 140 by suitable means, such as spot welds.

Figure 6:
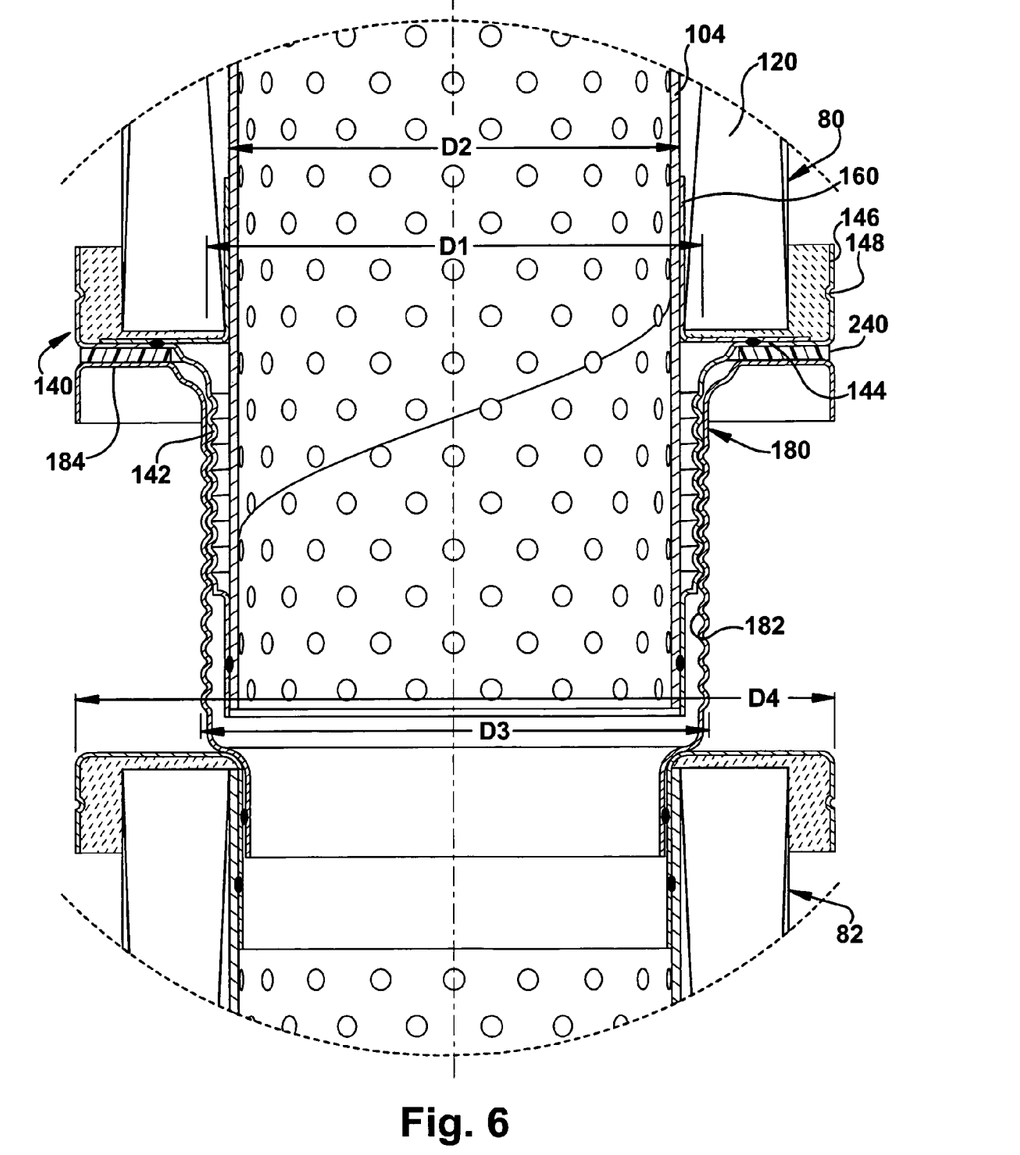
FIG. 6 is an enlarged sectional view of a portion of the filter assembly illustrated in FIG. 5.
Figure 7:
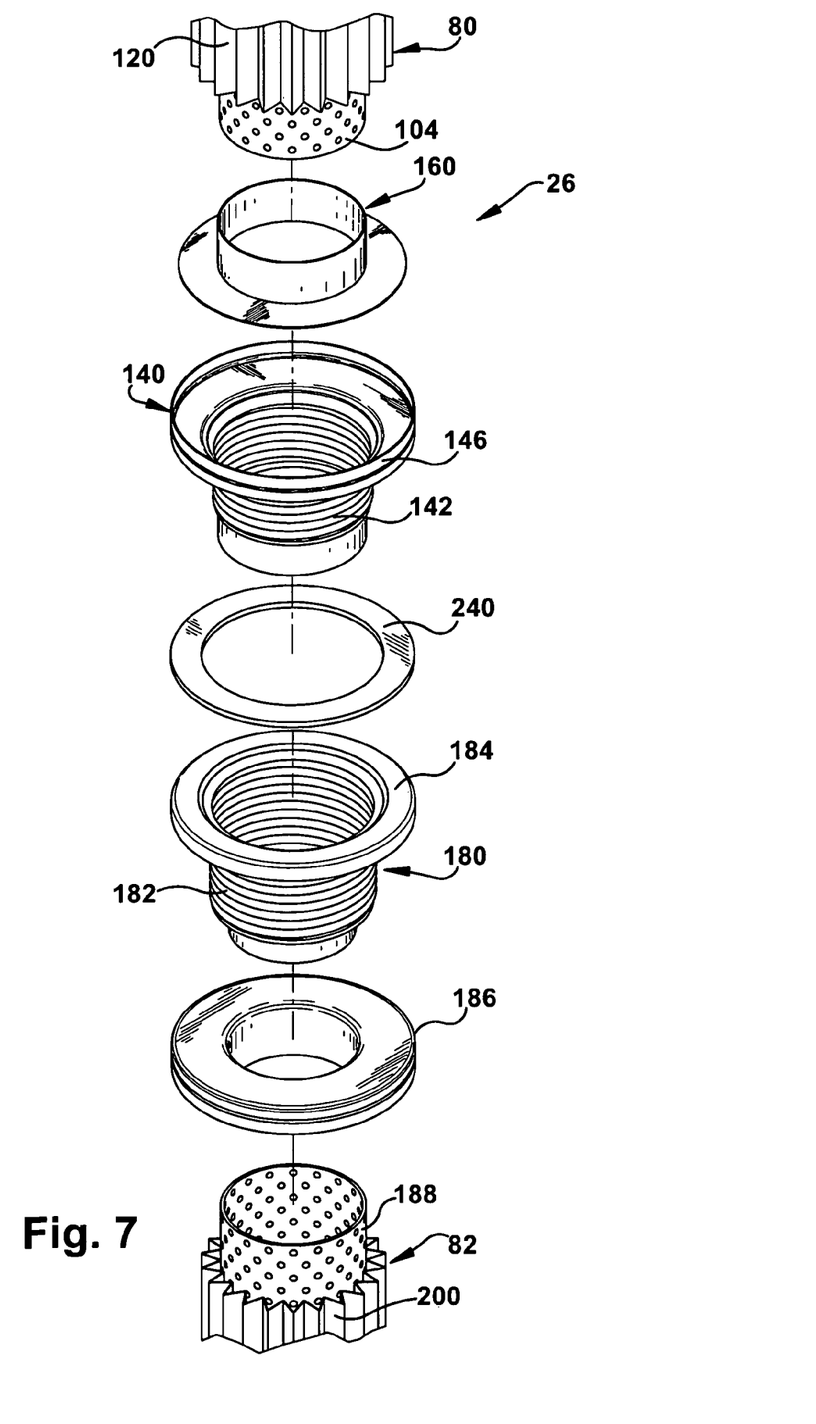
FIG. 7 is an enlarged exploded view of the connecting structure of the filter assembly.

Potting material is located between the exterior of the lower end of the pleated media 120, the flange 144 side wall 146 and spacer flange 160 to form a seal. The side wall 146 has a rolled bead 148 projecting into the potting material to resist removal.

The collar 140 includes an externally threaded portion 142 extending downwardly from the flange 144, as viewed in FIGS. 2-7. The threaded portion 142 of the collar 140, thus, projects from the upper filter element 80. The threaded portion 142 is located entirely outside of the axial extent L1 of the pleated filter media 120 to assure that the structure connecting the filter elements 80, 82 does not impede flow through the filter elements. The outer diameter D1 (FIG. 6) of the threaded portion 142 is larger than the inner diameter D2 of the pleated media 120 to provide a relatively stable connection between the upper filter element 80 and the lower filter element 82.

The lower filter element 82 includes another tubular member or collar 180 at its upper end (as viewed in FIGS. 2-7). The collar 180 defines an open end of the lower filter element 82 through which fluid, such as clean gas or air, may flow to the interior of the upper filter element 80. The collar 180 has an internally threaded portion 182 that is sized to be threaded onto the externally threaded portion 142 of the collar 140.

The collar 180 also has a radially extending flange portion 184. The collar 180 is made from a suitable material, such as sheet metal. A cap 186 is fixed to the collar 180 by swaging to inhibit fluid leakage at the interface of the cap and collar. The cap 186 is made from a suitable material, such as perforated sheet metal, expanded metal or mesh screen. The threaded portion 182 is threaded onto the threaded portion 142 of the upper filter element 80 to form the filter assembly 26 during installation in the baghouse 20.

A perforated tubular support tube 188 is fixed to the collar 180 in a suitable manner, such as by welds, rivets fasteners or metal deformation. The outer diameter D3 of the collar 180 is smaller than the outer diameter D4 of the first and second filter elements 80, 82. A pleated filter media 200 is disposed about and radially supported by the support tube 188. Potting material is located between the exterior of the upper end of the pleated media 200 and the cap 186 of the plate 220 to form a seal.

The filter element 82 is illustrated as having media retention devices 202 extending circumferentially about the pleated filter media 200. The retention devices 202 serve to hold the pleated filter media 200 in place during reverse pulse-jet cleaning. The retention devices 202 may be constructed as described in detail in U.S. Pat. No. 6,233,790 or 6,508,934, which are assigned to the assignee of the present invention and incorporated herein by reference.

A plate 220 is located at the lower end (as viewed in FIG. 3) of the lower filter element 82 to define a closed end of the lower filter element and the filter assembly 26. The plate 220 is preferably fixed to the tubular support member 186. Potting material is located between the exterior of the lower end of the pleated media 200 and the plate 220 to form a seal.

A compressible gasket 240 is located between a lower end surface of the collar 140 of the upper filter element 80 and an upper end surface of the collar 180 of the lower filter element 82. The gasket 240 compresses as the filter elements 80, 82 are threaded together.

A filter assembly 26 constructed according to one aspect of the invention was tested. The filter assembly 26 successfully passed an accelerated service life test of at least 176,000 reverse jet cleaning pulses at 5 to 7 inches of water while exposed to 350° F. temperature.

To effect installation of the filter assembly 26, a method as described below is followed. The method is directed to installing the relatively long filter assembly 26 in a new or existing baghouse 20. The method generally requires two people in the baghouse 20.

The method includes providing the upper filter element 80 with the pleated media 120. The mounting sleeve 100 is located at one end and the collar 140 is located at the opposite end. Fluid may flow through both ends of the upper filter element 80.

Preferably, both people are located in the clean air plenum 42 to connect together the filter elements 80, 82. The lower filter element 82 is held by one person so it is at least partially in the clean air plenum 42 and at least partially in the dirty air plenum 40. The upper filter element 80 is supported by the other person so it is entirely in the clean air plenum 42. The filter elements 80, 82 are aligned along the axis A and the collars 140 and 180 are brought into axial engagement. This requires that the lower filter element 82 is supported so it extends through the opening 46 in the tube sheet 44. The gasket 240 is placed between axially adjacent ends of the filter elements 80, 82. The filter elements are connected when one filter element is rotated about the axis A relative to the other filter element to engage the threaded portions 142, 182 and thread the collar 140 into the collar 180.

It will be apparent that a filter assembly 26 with a slightly different structure may optionally include a third filter element (not shown). The third filter element is located between and connected to the upper filter element 80 and the lower filter element 82 to provide flexibility in establishing a length of the filter assembly 26. The third element would have open axial ends and connecting structure at both ends.

From the above description of at least one aspect of the invention, those skilled in the art will perceive improvements, changes and modifications. Such improvements, changes and modifications within the skill of the art are intended to be covered by the appended claims.

Having described at least one aspect of the invention, what is claimed is:

1. A filter assembly for use in a baghouse, the baghouse having a tube sheet with a plurality of openings, the filter assembly comprising:
   a first filter element including a mounting structure at a first axial end to attach the first filter element to the tube sheet adjacent an opening, a first tubular member fixed to and extending from the mounting structure, a first pleated filter media disposed adjacent to the first tubular member, and a first member having a threaded portion connected with the tubular member at a second axial end of the first filter element;
   a second filter element including a second member having a threaded portion at a first axial end, a second tubular member connected with and extending from the second member, a second pleated filter media disposed adjacent to the second tubular member; and
   the first and second threaded members being tubular and the threaded portions being threadedly engageable to connect the first filter element with the second filter element and permit fluid communication between the first and second filter elements, the threaded portions of the first and second members located outside the axial extents of the first and second filter elements.

2. The filter assembly of claim 1 wherein at least one of the threaded portions of the first and second members has an outer diameter greater than the smallest inner diameter of the first and second pleated filter medias.

3. The filter assembly of claim 1 wherein the threaded portions of the first and second members has an outer diameter less than the largest outer diameter of the first and second filter elements.

4. The filter assembly of claim 1 wherein at least one of the first and second members includes a flange and side wall to surround an end portion of a respective filter element and that is filled with a potting material, the side wall having a portion projecting into the potting material to resist separation of the at least one member from the potting material.

5. The filter assembly of claim 1 wherein at least one of the first and second members includes one of the threaded portions swaged to a cup member to form a seal that inhibits leakage therebetween.

6. The filter assembly of claim 1 wherein the first member has an externally threaded portion extending from the second axial end of the first filter element and the second member has an internally threaded member extending from the first axial end of the second filter element.

7. The filter assembly of claim 1 further including an end plate at a second axial end of the second filter element to define a closed end of the second filter element.

8. A filter assembly for use in a baghouse, the baghouse having a tube sheet with a plurality of openings, the filter assembly comprising:
   a first filter element including a mounting structure at a first axial end to attach the first filter element to the tube sheet adjacent an opening, a first tubular member fixed to and extending from the mounting structure, a first pleated filter media disposed adjacent to the first tubular member, and a first member having a threaded portion connected with the tubular member at a second axial end of the first filter element;
   a second filter element including a second member having a threaded portion at a first axial end, a second tubular member connected with and extending from the second member, a second pleated filter media disposed adjacent to the second tubular member; and
   the first and second threaded members being tubular and the threaded portions being threadedly engageable to connect the first filter element with the second filter element and permit fluid communication between the first and second filter elements, at least one of the threaded portions of the first and second members has an outer diameter greater than the smallest inner diameter of the first and second pleated filter medias.

9. The filter assembly of claim 8 wherein the threaded portions of the first and second members located outside the axial extents of the first and second filter elements.

10. The filter assembly of claim 8 wherein the threaded portions of the first and second members has an outer diameter less than the largest outer diameter of the first and second filter elements.

11. The filter assembly of claim 8 wherein at least one of the first and second members includes a flange and side wall to surround an end portion of a respective filter element and that is filled with a potting material, the side wall having a portion projecting into the potting material to resist separation of the at least one member from the potting material.

12. The filter assembly of claim 8 wherein at least one of the first and second members includes one of the threaded portions swaged to a cup member to form a seal that inhibits leakage therebetween.

13. The filter assembly of claim 8 wherein the first member has an externally threaded portion extending from the second axial end of the first filter element and the second member has an internally threaded member extending from the first axial end of the second filter element.

14. The filter assembly of claim 8 further including an end plate at a second axial end of the second filter element to define a closed end of the second filter element.

15. A filter assembly for use in a baghouse, the baghouse having a tube sheet with a plurality of openings, the filter assembly comprising:
   a first filter element including a mounting structure at a first axial end to attach the first filter element to the tube sheet adjacent an opening, a first tubular member fixed to and extending from the mounting structure, a first pleated filter media disposed adjacent to the first tubular member, and a first member having a threaded portion connected with the tubular member at a second axial end of the first filter element;
   a second filter element including a second member having a threaded portion at a first axial end, a second tubular member connected with and extending from the second member, a second pleated filter media disposed adjacent to the second tubular member; and
   the first and second threaded members being tubular and the threaded portions being threadedly engageable to connect the first filter element with the second filter element and permit fluid communication between the first and second filter elements, the threaded portions of the first and second members located outside the axial extents of the first and second filter elements and at least one of the threaded portions of the first and second members has an outer diameter greater than the smallest inner diameter of the first and second pleated filter medias.

16. The filter assembly of claim 15 wherein the threaded portions of the first and second members has an outer diameter less than the largest outer diameter of the first and second filter elements.

17. The filter assembly of claim 15 wherein at least one of the first and second members includes a flange and side wall to surround an end portion of a respective filter element and that is filled with a potting material, the side wall having a portion projecting into the potting material to resist separation of the at least one member from the potting material.

18. The filter assembly of claim 15 wherein at least one of the first and second members includes one of the threaded portions swaged to a cup member to form a seal that inhibits leakage therebetween.

19. The filter assembly of claim 15 wherein the first member has an externally threaded portion extending from the second axial end of the first filter element and the second member has an internally threaded member extending from the first axial end of the second filter element.

20. The filter assembly of claim 15 further including an end plate at a second axial end of the second filter element to define a closed end of the second filter element.

* * * * *